(No Model.)  2 Sheets—Sheet 1.
D. F. HENRY.
BRAKE.
No. 551,964. Patented Dec. 24, 1895.
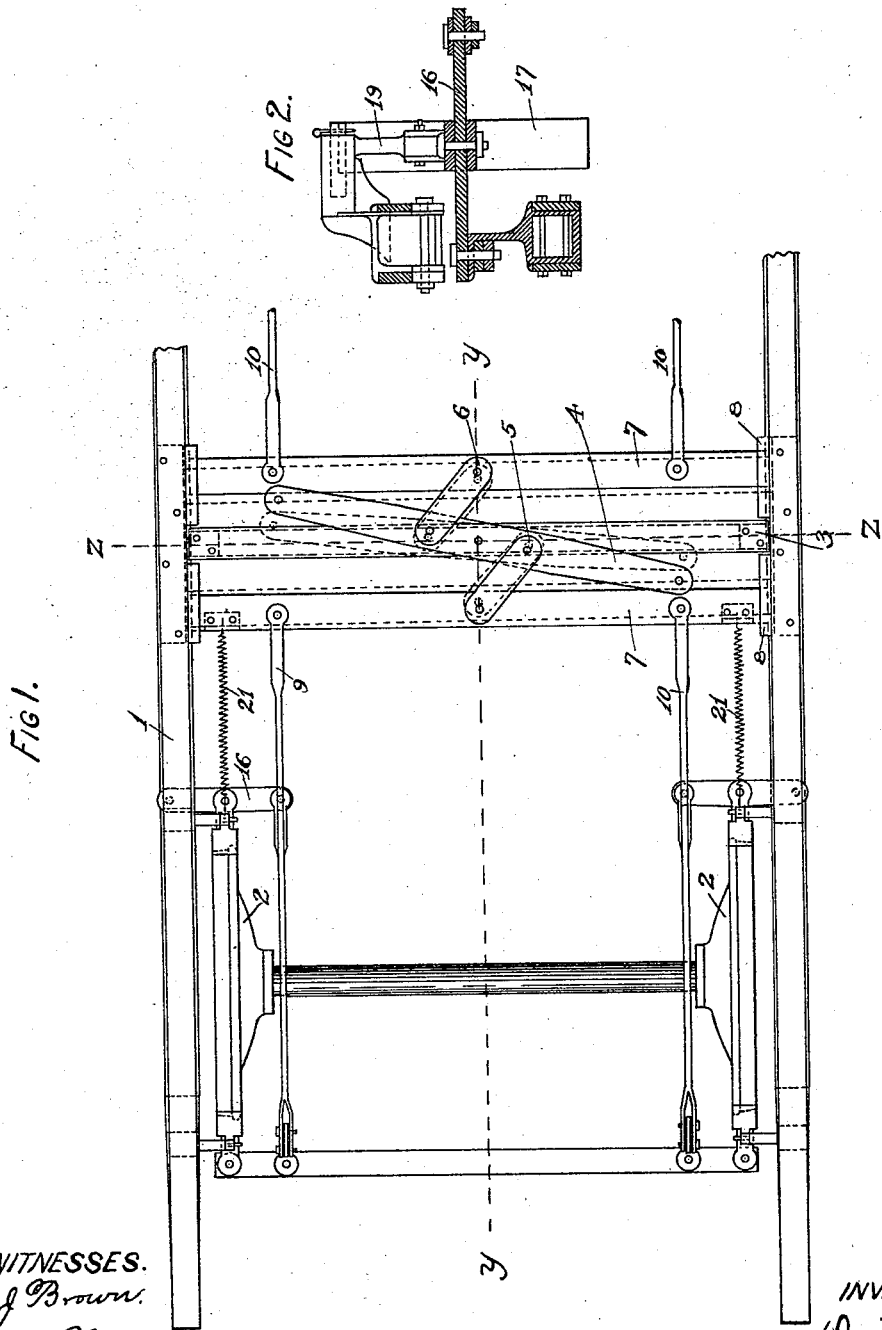
WITNESSES.
W. J. Brown.
C. A. Williams
INVENTOR
David F. Henry
BY
Jno. H. Rowley
ATTORNEY.

(No Model.) 2 Sheets—Sheet 2.
D. F. HENRY.
BRAKE.
No. 551,964. Patented Dec. 24, 1895.
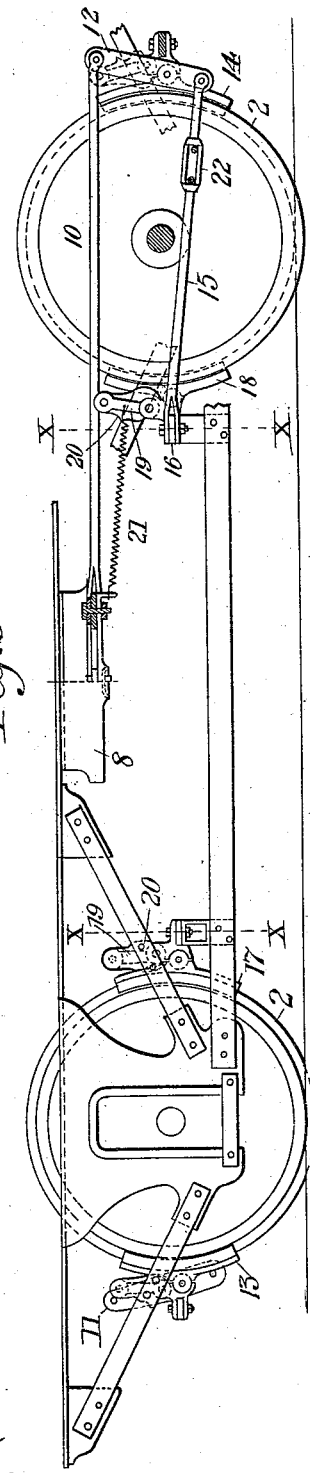
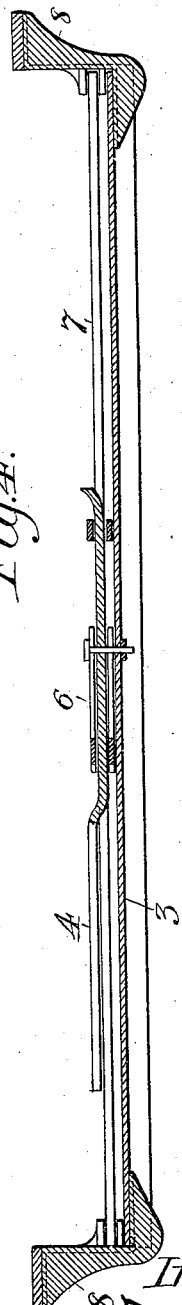
Witnesses:
R. D. Layton
C. A. Williams
Inventor:
David F. Henry
by John H. Roney
attorney
ANDREW B.GRAHAM, PHOTO-LITHO, WASHINGTON, D.C.

UNITED STATES PATENT OFFICE.

DAVID F. HENRY, OF ALLEGHENY, PENNSYLVANIA.

BRAKE.

SPECIFICATION forming part of Letters Patent No. 551,964, dated December 24, 1895.

Application filed March 9, 1895. Serial No. 541,145. (No model.)

*To all whom it may concern:*

Be it known that I, DAVID F. HENRY, a citizen of the United States, residing at Allegheny, in the county of Allegheny and State of Pennsylvania, have invented certain new and useful Improvements in Brakes; and I do hereby declare the following to be a full, clear, and exact description of the invention, such as will enable others skilled in the art to which it pertains to make and use the same, reference being had to the accompanying drawings, which form a part of this specification, in which—

Figure 1 indicates a plan view of a portion of a car-truck, showing the application of my improved brake applied thereto. Fig. 2 is a section through line $x\ x$ of Fig. 3. Fig. 3 is a view on line $y\ y$ of Fig. 1, showing my improved brake, in elevation, applied thereto. Fig. 4 is a section through line $z\ z$ of Fig. 1.

My invention relates to brakes for cars, and is especially adapted to street-railway cars.

The object of my invention is to produce a brake by the application of which the brake-shoes may be simultaneously tightened upon the front and rear wheels of a truck on both sides simultaneously; and to this purpose it consists of the novel construction and arrangement of parts hereinafter described, reference being had to the accompanying drawings, in which like numerals indicate like parts wherever they occur.

Referring to said drawings, 1 is a car-truck mounted on wheels 2 2. Between said wheels and at the middle of the car-truck, and suitably supported in the side pieces of the same, I arrange a cross piece or bar 3, rigidly fastened to the said side pieces of said truck in any suitable manner. Pivotally mounted upon said transverse bar 3 is a long lever 4, to which are pivotally secured, equidistant from the pivotal point of said long lever, two links 5 and 6 parallel to each other on an angle, the opposite ends of the same being respectively secured to slide-bars 7 7, the ends of which are adapted to slide longitudinally in the recess in the brackets 8 8, which are secured on the truck at the center of the same. To each of said sliding bars are attached lever-rods 9 and 10 respectively, which extend forwardly and rearwardly of the truck respectively, and are pivotally connected to the levers 11 and 12 respectively, which are respectively connected to the brake-shoes 13 13, that engage upon the forward rim of the forward wheels, and the brake-shoes 14 14, which engage against the rear of the rear wheels respectively. To the lower ends of the levers 11 and 12, respectively, are suitably secured the connecting-rods 15 15, which are connected to levers 16 16, which are pivotally secured upon the side pieces of said truck, and are connected to the brake-shoes 17 and 18 respectively.

19 19 are links pivotally secured at the upper ends in the brackets or castings 20 20 and being connected at the lower end to the brake-shoes 17 and 18 respectively. 21 21 are spiral springs connected to said links and to the slide-bars 7 7.

The operation of my device is as follows, viz: Brake-rods are connected to the ends of the long lever 4 and when operated by the motorman he swings said lever 4 upon its pivotal point, causing the slide-bars 7 7 connected to said lever 4 to move toward each other by means of the parallel links 5 and 6 respectively, drawing the brake-shoes 13 and 14, respectively, against the forward rim of the forward wheel and the rear rim of the rear wheel, respectively, by means of the connecting-rods 10 10 and simultaneously therewith applying the brake-shoes 17 and 18 to the opposite sides of said wheels, respectively, by means of a connecting-rod 15, which is actuated by the lever 12. Said connecting-rod may be provided with a turnbuckle 22 for the purpose of lengthening or shortening the same. When the brakes are withdrawn, the reverse movement of the large lever 4 causes the release of the brake-shoes 13 and 14, respectively, and the retraction of the springs 21 21 causes the release of the brake-shoes 17 and 18 respectively.

Having described my invention, what I claim, and desire to secure by Letters Patent, is—

1. In a brake for cars, the combination of two horizontal parallel slide bars; a lever pivotally secured between said bars and connected therewith by links, the point at which said links are secured to their respective bars, and the pivotal point of said lever, being in the same line; rods connecting one of said bars with brake shoes on the rear end of the car, and rods connecting the other bar with brake shoes at the forward end of the car, substantially as described.

2. In a car brake, the combination of two horizontal parallel bars, the ends respectively of which engage in slides formed in the inner sides of the sills of the car; a lever pivotally secured between said bars, and connected therewith by links, the point of such connection and the pivotal point of said lever, being in the same line; rods connecting one of said bars with brake shoes on the rear end of the car, rods connecting the other bar with brake shoes at the forward end of the car; levers connecting said brake shoes and said connecting rods; connecting rods secured to the lower end of said last mentioned lever, and to a lever pivotally secured to the truck frame, and attached to brake shoes on the opposite side of the wheels of the first mentioned brake shoes, whereby when the said slide bars are actuated by the lever pivoted between the same, the brake shoes on both sides of said wheels are simultaneously applied, substantially as described.

3. In a car brake, the combination of slide bars, adapted to be reciprocated by the compound lever; rods connecting brake shoes at the forward and rear ends of the car truck respectively; brake shoes upon the rear wheels at the front thereof, and on the front wheels at the rear thereof; connecting rods connecting said last mentioned shoes with a lever adapted to be actuated by said first mentioned connecting rod, and spiral springs connecting said brake shoes on the front of the wheel, and the rear of the front wheels to said slide bars, whereby brake shoes may be simultaneously applied to both sides of all the wheels of the car truck, and by reversing said compound lever, causes the release of brake shoes engaging against the front of the front wheels and the rear of the rear wheels, the retraction of the springs releasing brake shoes on the rear of the front wheels, and the front of the rear wheels respectively, substantially as described.

In testimony that I claim the foregoing I hereunto affix my signature this 9th day of February, A. D. 1895.

DAVID F. HENRY. [L. S.]

In presence of—
JAS. J. McAFEE,
C. A. WILLIAMS.